United States Patent Office 3,488,172
Patented Jan. 6, 1970

3,488,172
METHOD AND APPARATUS FOR MAKING GLASS FIBERS FROM A PALLADIUM-IRIDIUM BUSHING
Joseph Aliotta, Fords, N.J., and Edward L. Satterfield, Anderson, S.C., assignors to Owens-Corning Fiberglas Corporation, a corporation of Delaware
No Drawing. Filed Nov. 2, 1966, Ser. No. 591,423
Int. Cl. C03b 37/00
U.S. Cl. 65—1
4 Claims

ABSTRACT OF THE DISCLOSURE

This application discloses a method and apparatus for manufacturing glass fibers from a bushing fabricated from an alloy containing 95 to 99.7% palladium and from 5 to 0.3% iridium by weight. The bushing is fabricated by melting and casting under a vacuum of about 1 mm. of mercury.

---

This invention relates to a method of manufacturing glass fibers and is based on the discoverey of a new use for a highly resistant alloy of palladium and iridium. The invention also includes a specific alloy of these metals having unusual and highly desirable properties.

The present method of manufacturing glass fibers comprises the issuance of streams of molten glass from orifices in a metallic part called a bushing, and the attenuation of the streams of molten glass to form fibers of a desired diameter. Each part of the process has undergone rigorous research and development and is the subject of extensive patent literature. The bushing, referred to above, is conventionally an electrically heated wedge-shaped metal part through which a series of orifices are formed to deliver small streams of molten glass. Such an assembly is shown in U.S. Patents 2,515,738 and 2,165,318. In the prior art, the alloy from which the best bushings are fabricated is made from platinum and rhodium, usually consisting of 90% or more of platinum and up to 10% rhodium. The characteristics of any alloy to be suitable for use as a bushing in the manufacture of glass fibers must be such that it is not only weldable and mechanically workable, but more importantly that it be chemically and physically resistant to the action of the glass which, although molten, is nevertheless highly erosive to the bushing metal. The bushing material must also be stable at high operating temperatures in the order, for example, of 1800° F. to 2100° F. The platinum-rhodium alloy above described and commonly used in the art has all of the necessary characteristics. However, the platinum-rhodium alloy is not only very expensive, but platinum is becoming increasingly scarce and in time of war or threat of war the platinum metal is virtually sequestered for defense purposes.

Efforts have been made in the past to find other alloys which can be used to fabricate bushings for use in the production of glass fibers and which have characteristics chemically and mechanically at least equivalent to those of the platinum-rhodium alloy but which are much more readily obtainable and less expensive. The present invention is based upon the discoverey of such an alloy and its use thereof in the manufacture of glass fibers.

The primary object of the invention, therefore, is to provide a method of making glass fibers by the use of a bushing composed of certain palladium-iridium alloys.

It has been found that while many palladium-iridium alloys are suitable, particular ones of the alloys are preferred because of various properties thereof, and preferred methods of forming the bushings from the alloys are also a part of the invention.

In one embodiment the invention comprises a method of making glass fibers wherein the glass fibers are formed by the attenuation of streams of molten glass issuing from orifices in a bushing fabricated from an alloy consisting essentially of from about 95% to about 99.7% palladium and from about 5% to about .3% iridium, based on the weight of the alloy.

In another aspect, the invention comprises the fabrication of a bushing from an alloy consisting essentially of from about 95% to about 99.7% palladium and from about 5% to about .3% iridium in which the bushing is fabricated by melting and casting the metal under vacuum.

It has been found that a bushing fabricated from an alloy of the above composition exhibits substantially the same characteristics as the platinum-rhodium alloy of the prior art, under use conditions. The palladium-iridium alloy, however, is less expensive to make (because the starting materials are less expensive) and the metals are easier to obtain than platinum and rhodium. The alloy of this invention is substantially as resistant to abrasion and erosion as a platinum-rhodium alloy, and it stands up well at the temperatures to which it is subjected, i.e., in the order of 1800° F.–2100° F. or greater. Its stress-strain characteristics are also substantially the same as a platinum-rhodium alloy. An especially preferred composition is one containing 98.5% palladium and 1.5% iridium. The alloy of this preferred composition has better welding properties than the alloys having a higher iridium content so that the bushings can be more easily fabricated.

It has been found that palladium-iridium bushings which will stand up under use conditions can best be fabricated from an alloy which has been melted and cast while under a vacuum. The bushing when fabricated from a vacuum melted and cast alloy exhibits significantly greater stress-strain characteristics than an alloy not so made. The reason for this is not precisely known, but it is suspected that alloys which are vacuum melted are purer than those melted by conventional techniques.

The alloy described herein can contain minor impurities but such impurities should not be present in large enough quantities to affect the physical or chemical characteristics of the alloy.

A preferred apparatus for vacuum melting and casting the alloy is a Stokes Model 900–437–521 Induction Heated Vacuum Furnace, sold by the F. J. Stokes Corporation, Philadelphia, Pa.

In the vacuum melting process small cubes (approximately ¼ inch on each side) of metal (2 kg. total) are placed in a zircon crucible, a layer of iridium on the bottom and a layer of palladium on top of the iridium, followed by alternating layers of iridium and palladium. The reason for the sandwich of metals is to insure complete mixing when they are being melted. Thereafter the furnace chamber is purged with argon and subsequently evacuated down to about 1 mm. Hg and the induction heating coil turned on.

The alloy is then melted for the desired time and at the desired temperature. Since metal working is essentially an art rather than a science, the exact conditions of the vacuum melting cannot be set down with specificity. It is essential, however, that the alloy be brought to such a state that when it is poured into the mold and solidified (still under vacuum) the shrinkage void stays near the top of the mold and is no more than about ½ inch deep. It is also essential that all gases be purged from the metal. This state is achieved when the molten metal stops bubbling.

After the molten metal has been brought to the desired state, the heat is turned off and the top of the melt is allowed to solidify or bridge over. Thereafter the heat is turned on for approximately 1 minute and the melt is then poured into a copper mold located within the furnace and allowed to solidify. Copper is used for the mold because it absorbs heat rapidly.

After solidification, the mold is removed from the furnace and the alloy is removed from the mold and the uneven surface shaved off. It is then annealed, rolled to the desired thickness, and cut into appropriate sized pieces and fabricated, by welding, into a bushing. After the bushing is fabricated appropriate holes are cut in the bottom thereof (for glass streams) and the burrs are removed. It is preferred that the alloy be vacuum annealed but it can be annealed in the presence of argon or nitrogen with acceptable results.

In accordance with the invention the composition of the alloy from which the bushing is fabricated can be varied from about 95% palladium to about 5% iridium, to about 99.7% palladium to about .3% iridium, with substantially no diminution in the physical characteristics of the alloy. The alloy containing about 98.5% palladium and about 1.5% iridium is preferred because of its superior weldability and thus the ease with which the bushing can be fabricated.

It will be appreciated that while the alloy of this invention has been described herein as particularly suitable for fabricating bushings for the manufacture of glass fibers, it can also be used for fabricating other forms of glass handling equipment, for example, as illustrated in U.S. Patent No. 2,031,083.

What we claim is:
1. The method of manufacturing glass fibers which includes flowing streams of molten glass through a plurality of openings in a bushing composed of an alloy fabricated by melting and casting under vacuum in the order of about 1 mm. of mercury, said alloy consisting essentially of from about 95% to about 99.7% palladium and from about 5% to about .3% iridium by weight, and attentuating said streams to a desired fiber diameter.
2. The method in accordance with claim 1 in which said bushing is composed of an alloy consisting essentially of about 98.5% palladium and about 1.5% iridium.
3. As a new article of manufacture, a bushing comprising an electrically heated wedge-shaped metal part through which a series of orifices are formed to deliver small streams of molten glass, for use in the manufacture of glass fibers, said bushing being composed of an alloy fabricated by melting and casting under vacuum in the order of about 1 mm. of mercury, said alloy consisting essentially of from about 95% to about 99.7% palladium and from about 5% to about .3% iridium by weight.
4. A bushing as claimed in claim 3 composed of an alloy consisting essentially of about 98.5% palladium and about 1.5% iridium.

References Cited

UNITED STATES PATENTS 2,165,318   7/1939   Thomas et al.
2,967,792   1/1961   Ruthardt.

FOREIGN PATENTS 1,177,349   9/1964   Germany.

OTHER REFERENCES

Bestimmung der Schmelzpunkte von Platinlegierungen Von Ludwig Müller; Gekürzte Frankfurter Dissertation, May 24, 1930, in der Sitzung des Gauvereins Hessen der Deutschen Phys. Ges in Marburg, pp. 33 and 34, R. P. Elliott; Constitution of Binary Alloys, First Supplement; McGraw-Hill 1965, pp. 559–560.

Die Palladium-Iridium-Legierugen; E. Raub and W. Plate; Z. Metallk, 48, 1957, pp. 444–447.

S. LEON BASHORE, Primary Examiner

R. L. LINDSAY, Jr., Assistant Examiner

U.S. Cl. X.R.
65—374; 75—172